United States Patent [19]

David

[11] 3,877,338

[45] Apr. 15, 1975

[54] METHOD AND SYSTEM FOR COMPOSING MUSICAL COMPOSITIONS

[76] Inventor: Mack David, 875 Comstock Ave., Los Angeles, Calif. 90024

[22] Filed: Apr. 19, 1974

[21] Appl. No.: 462,518

Related U.S. Application Data

[63] Continuation of Ser. No. 377,081, July 6, 1973, abandoned.

[52] U.S. Cl. .................................................. 84/453
[51] Int. Cl. .................................................. G10g 1/00
[58] Field of Search ................ 84/462; 179/100.2 E; 340/174.1 J

[56] References Cited

UNITED STATES PATENTS

| | | | |
|---|---|---|---|
| 2,733,301 | 1/1956 | Bradbury | 179/100.2 E |
| 3,727,203 | 4/1973 | Crossman | 340/174.1 J |

*Primary Examiner*—Lawrence R. Franklin
*Attorney, Agent, or Firm*—Richards, Harris & Medlock

[57] ABSTRACT

The specification discloses an electronic system for composing songs which includes a first magnetic recording and playback device having a series of different lyric phrases stored thereon. The system also includes a second magnetic recording and playback device having a series of different melody phrases stored thereon. A console includes switches for selecting desired ones of the lyric and melody phrases. Circuitry is responsive to the setting of the switches for operating the playback devices to playback selected ones of the lyric and melody phrases. The selected lyric and melody phrases are mixed and a third recording and playback device is operable under the control of a switch on the console for recording the mixed lyric and melody phrases to provide a complete song.

5 Claims, 9 Drawing Figures

METHOD AND SYSTEM FOR COMPOSING MUSICAL COMPOSITIONS

This is a continuation of application Ser. No. 377,081, filed July 6, 1973, now abandoned.

FIELD OF THE INVENTION

This invention relates to the composing of musical compositions, and more particularly relates to a method and system for composing lyrics and melodies.

THE PRIOR ART

Music presently has a substantial influence upon our civilization, as it is constantly listened to by people at work, play or during relaxation. Sales of musical instruments, recording devices, tapes and records are booming, as the present highly mechanized world and the resulting reduced work week have significantly increased the time in which people spend in either playing music, listening to music or composing music. As this trend of increased music appreciation has developed, the urge for creating music has grown significantly. However, many people have not had the training or experience in which to satisfy the urge to create musical compositions. Thus, a need has arisen for a technique to allow an untrained person to create technically correct music structured properly in both melody and lyrics, thereby satisfying the creative urge of the person and at the same time developing a music structuring awareness that may be retained by the person.

SUMMARY OF THE INVENTION

In accordance with the present invention, a method and system are presented which fulfills the needs noted above in allowing an untrained person to originate and record musical compositions with both melody and lyrics which are aesthetically acceptable and technically correct in form. In addition, the present technique allows the user to combine original melody or lyric phases with the composition composed according to the present technique.

In accordance with a more specific aspect of the invention, a system is provided for composing a lyric or melody composition which includes a device for storing a series of different lyric or melody phrases and including circuitry for playing back selected ones of the lyric or melody phrases. Apparatus is provided to record the selected sequence of lyric or melody phrases to provide a unitary lyrical or musical composition.

In a more specific aspect of the invention, an electronic system is provided for composing songs which includes a first magnetic recording and playback device having a series of different lyric phrases stored thereon. A second magnetic recording and playback device has a series of different melody phrases stored thereon. A console is provided with switches for selecting desired ones of the lyric and melody phrases stored on the first and second magnetic devices. Circuitry is responsive to the setting of the switches for operation of the playback devices to playback selected ones of the lyric and melody phrases. The selected lyric and melody phrases are then mixed and are recorded on a third magnetic recording and playback device under the control of a switch on the console, in order to provide a unitary song made up of the mixed lyric and melody phrases.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
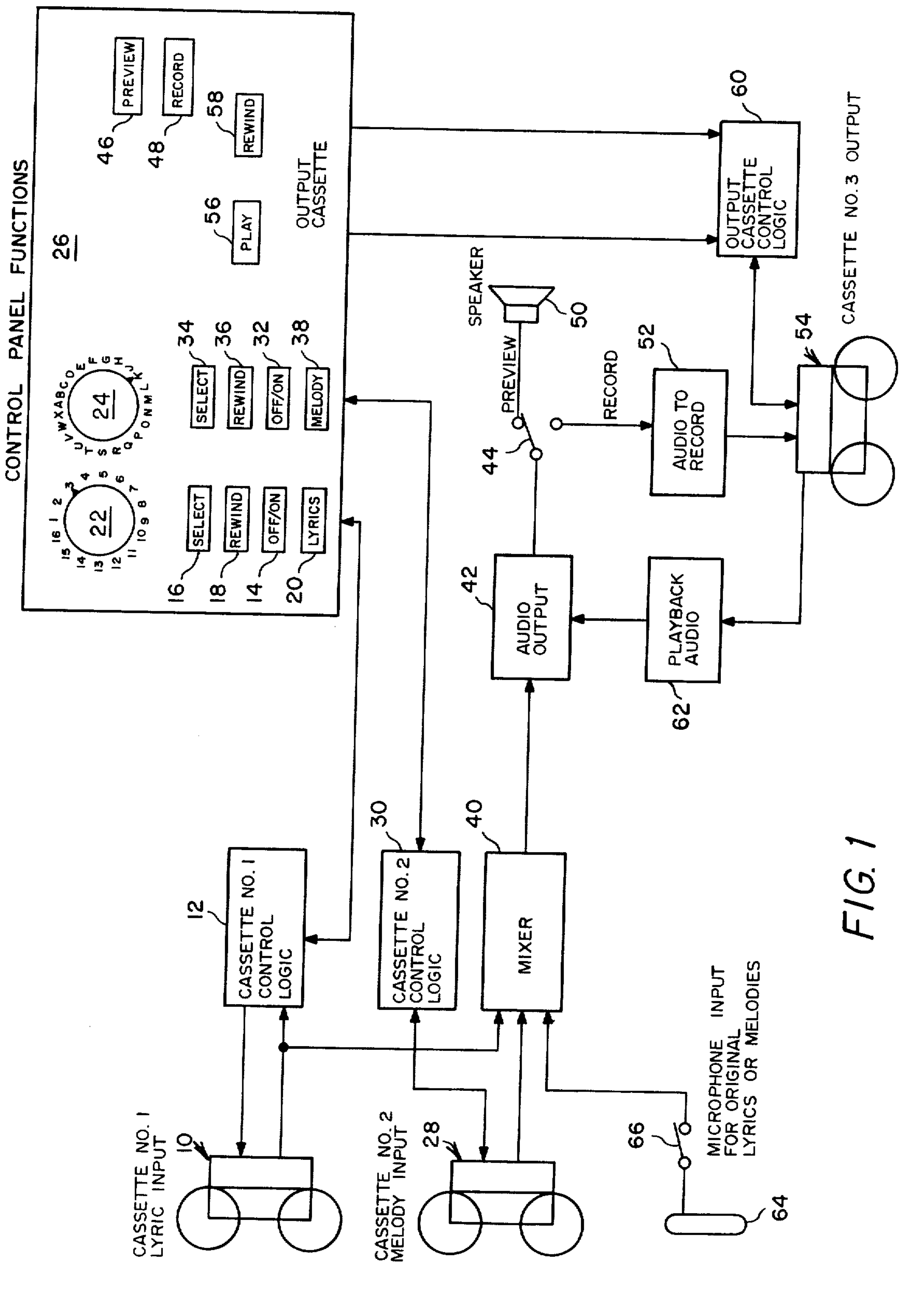
FIG. 1 is a block diagram of the preferred embodiment of the present system.

FIG. 1 illustrates a block diagram of the preferred embodiment of the invention. The system includes a first playback and recording magnetic tape storage or cassette unit 10 which comprises any suitable conventional playback and recording device in which tape cassettes or reels may be inserted, played or recorded upon, and detached. Cassette 10 is adapted to receive a magnetic tape cassette on which a series of different lyric phrases have been prerecorded. In the preferred embodiment, these lyric phrases are subdivided into 16 different groups, with each lyric phrase being of length to be matched with a two bar melody phrase.

As will be subsequently described in detail, in the preferred embodiment, the lyric phrases are separated by coded tone signals identifying a location address of the lyric phrases to enable automatic selection and playing of the lyric phrases with the present system. The playback and record functions of the cassette 10 are controlled by cassette control logic 12 which is operated in response to the depression of a lyric off/on switch 14, a lyric select switch 16 and a rewind switch 18. A lyric lamp 20 is illuminated during operation of the device in a manner to be subsequently described. Two rotary select switches 22 and 24 are also mounted on the face of a console panel 26 which houses the electronic circuitry, the cassettes, the microphone and speakers of the illustrated system.

A second playback and recording storage or cassette unit 28 is included in the system and is of the same type as the previously described cassette unit 10. Cassette unit 28 is adapted to receive a magnetic tape cassette having a series of different two bar melody phrases serially recorded thereon. As in the same manner as the lyric phrases, the melody phrases are arranged in the preferred embodiment in sixteen groups or sets and are separated by coded tone signals identifying a location address of the melody phrases. The playback and record functions of the cassette 28 are controlled by the cassette control logic 30 which operates under the control of a melody off/on switch 32, a melody phrase select switch 34 and a melody phrase rewind switch 36. A melody lamp 38 is energized during operation of the system. Rotary switches 22 and 24 are utilized to select the desired melody phrase from the plurality of melody phrases recorded on the cassette 28.

The audio output from each of the cassettes 10 and 28 are directed to a mixer circuit 40 which mixes the lyric and melody phrases and directs the mixed audio signals through an audio output 42 to a preview-record switch 44. The audio output 42 will normally comprise a driver amplifier. The switch 44 is controlled by operation of a preview pushbutton switch 46 and by a pushbutton record switch 48 located on the front panel 26 of the console unit. Depression of the button 46 causes the switch 44 to be switched to the illustrated position in order to connect the audio output with the input of a speaker 50 so that the mixed audio signals will be played back to the operator. Depression of the record pushbutton switch 48 will cause the switch 44 to be switched to the input of an audio to record circuit 52 which directs the audio signals to a third magnetic recording and playback cassette unit 54, such that the mixed lyric and melody phrases are recorded on cassette 54.

A play pushbutton switch 56 and a rewind pushbutton switch 58 are located on the control panel 26 in order to control, through control logic 60, the operation of the cassette 54. Depression of the record pushbutton switch 48 causes the cassette 54 to record the mixed audio signals. Depression of the play pushbutton switch 56 causes the signals recorded upon the cassette 54 to be played back through a playback audio circuit 62 to the audio output 42 and to the speaker 50. The playback audio circuit 62 will normally comprise a magnetic preamp or the like.

In addition to the circuitry for selecting ones of the lyric and melody phrases stored on cassettes 10 and 28, a microphone input 64 is provided, along with an off/on switch 66 connected to the mixer 40. The user may use the input 64 to record original lyrics or melodies with the prerecorded phrases.

In operation of the system shown in FIG. 1, the user first sets the rotary switch 22 at the number 1 position and then rotates the rotary switch 24 to the desired letter corresponding with the selected first lyric phrase. In the preferred embodiment, sixteen groups each having 23 different lyric phrases are recorded upon the cassette 10. Of course, the number of phrases may be varied for differnt applications. These lyric phrases may be printed upon a printed sheet and the user may select the first lyric phrase from the sheet, if desired. If this is not desired, the user may listen to each of the lyric phrases by selective rotation of the switch 24 to each of the 23 different positions.

When the switches 22 and 24 are set to the desired position, the lyric off/on switch 14 is depressed to energize the lyric system and then the select switch 16 is depressed. The control logic 12 will then cause the cassette 10 to advance the magnetic recording tape until the desired lyric phrase is positioned in front of the playback head. At this time, the movement of the tape will be stopped and the lyric lamp 20 will be illuminated to indicate to the user that the desired phrase is available for playback. The user may then depress the preview button 46 and the desired lyric phrase will be played from the cassette 10, applied through the mixer 40 and the audio output 42 and audibly reproduced by the speaker 50. If this lyric suits the user, the user can then depress the rewind button 18 and the magnetic tape will be reversed in the cassette 10 to a position to again play the selected lyric phrase when desired. If the user is not satisfied with this lyric phrase, the user may move the selector switch 24 to another position and repeat the above-noted procedure.

The user at this time is now ready to select a melody phrase to match with the selected lyric phrase. The off/on switch 14 is placed in the off position. The rotary switch 22 is left in the first position and the rotary switch 24 is moved to the desired position. The melody phrases in the first group are chosen to be compatible in meter and recording time length with the lyric phrases in the first group.

The off/on button 32 is then depressed to energize the melody selection system. The select button 34 is depressed and the control logic 30 operates the cassette 28 to advance the magnetic tape to a position just in advance of the desired melody phrase, as determined by the setting of the switches 22 and 24. When reaching this point, the tape is stopped and the melody lamp 38 is illuminated. The user may then depress the preview button 46 and the cassette 28 plays back the selected melody phrase through the mixer 40 and through the audio output 42 to the speaker 50 so that the user can hear the selected melody phrase. If the user is satisfied, the rewind button 36 is depressed and the magnetic tape is rewound in the cassette 28 to a position just in advance of the selected melody phrase.

The user may then again depress the off/on button 14, such that both the lyric and melody cassettes are energized. The record button 48 is then depressed and both cassettes 10 and 28 are energized to play back the selected lyric phrase and the selected melody phrase to the mixer 40. The two audio outputs are mixed by the mixer 40 and are applied through the audio output 42 and through the audio to record 52 for recording on the cassette 54. Alternatively, if the user desires to preview the combined lyric and melody prior to recording, the preview button 46 is depressed and the combined output is broadcast through the speaker 50. After recording of the mixed lyric and melody phrases, the recorded output may be played back by depression of the play button 56, upon which the audio signals recorded on the cassette 54 are played back through the playback audio 62 and the audio output 42 to the speaker 50. After playing back of the recorded phrases, the cassette 54 may be rewound by operation of the rewind button 58.

After the first lyric and melody phrases have been selected and combined as previously noted, the user then rotates the rotary switch 22 to the second position. This selects a different set of lyric and melody phrases which are particularly adapted for combination with one another and for following the phrases selected from group 1. The procedure enumerated above is then repeated by the user until a second set of lyric and melody phrases have been selected and recorded on the cassette 54. The rotary switch 22 is then moved to position three and the procedure repeated. The procedure is repeated throughout all 16 positions of switch 22, until 16 two bar lyric and melody phrases have been sequentially stored on the cassette 54 to provide a complete 32-bar song. The song may then be played back from the cassette 54 by first rewinding the cassette 54 by operation of the button 58 and then by depression of the play button 56. The user may then remove the magnetic tape cassette stored in the cassette 54, may record another song at the end of the just completed song, or may erase the first song by recording another song over it.

In addition, the user may record his own lyrics, melody or harmony by turning off either or both of the prerecorded lyrics and melody circuits by depressing the appropriate off/on switches 14 or 32 and by attaching a microphone to the microphone input 64.

As previously noted in the preferred embodiments, 16 groups each having 23 different lyric and melody phrases are recorded upon the cassettes 10 and 28. The lyric phrases in the first group are adapted to be combined with the melody phrases in the first group, and also the lyric phrases in the first group are adapted to preceed the lyric phrases in the second group. While it will be understood that more or less than 368 lyric phrases may be recorded on a tape for use with the invention, and also that a wide variety of different lyric content and styles may be utilized, the following is a typical listing of portions of contemporary lyric phrases for use with the invention:

TABLE I

| | |
|---|---|
| Group 1 | |
| 1A | I am very happy |
| 1B | I am very lonely |
| 1C | Moonlight on the wildwood |
| . | |
| . | |
| 1X | |
| Group 2 | |
| 2A | When you are near to me |
| 2B | So happy I could cry |
| 2C | And skies are blue above |
| 2D | When we are far apart |
| 2E | And you are far away |
| 2F | Now that you've gone from me |
| 2G | The skies are bright above |
| 2H | So peaceful is the night |
| 2I | Beside a rippling stream |
| . | |
| . | |
| 2X | |
| Group 3 | |
| 3A | Oh, so very happy |
| 3B | You make me so happy |
| 3C | I am very lonely |
| 3D | I am sad and lonely |
| 3E | Oh, so very lonely |
| 3F | Thinking of you only |
| 3G | Twilight in the wildwood |
| 3H | Thinking of my childhood |
| 3I | Thinking of my darling |
| . | |
| . | |
| 3X | |
| Group 4 | |
| 4A | Because you're here with me |
| 4B | For you're so dear to me |
| 4C | This night is ecstasy |
| 4D | And your're the reason why |
| 4E | A dream is drifting by |
| 4F | This night was made for love |
| 4G | This time I know it's love |
| 4H | You're all I'm dreaming of |
| 4I | I feel the teardrops start |
| 4J | Why did you break my heart |
| 4K | The skies are dark and grey |
| 4L | "Come back to me", I pray |
| 4M | You're just one star away |
| 4N | How blue this world can be |
| 4O | Dark clouds are all I see |
| 4P | My heart's in misery |
| 4Q | And you with me to love |
| 4R | The night is filled with love |
| 4S | Sweet memories I love |
| 4T | And heaven is in sight |
| 4U | Two arms to hold me tight |
| 4V | And everything feels right |
| 4W | I'm drifting on a dream |
| 4X | How near the heavens seem |

TABLE I-Continued

| |
|---|
| Groups 5–16 |
| . |
| . |
| . |
| 16A-X |

Only a portion of the full 368 lyric phrases are included in Table I for illustration purposes. However, a large number of acceptable combinations of lyrics from the various groups is possible. As noted previously, any one of the 23 lyric phrases in Group I may be utilized prior to any one of the 23 lyric phrases in Group 2. Similarly, any one of the 23 lyric phrases in Group 2 may be used in front of any of the lyrics in Group 3, and so on. The following Table II lists a portion of the acceptable lyric phrase combinations which may be provided from the lyric phrases set forth in Table I:

TABLE II

| | | | |
|---|---|---|---|
| 1A+2A | 1C+2G+3G | 1A+2G+3B+4F | 1B+2F+3C+4N |
| 1A+2B | 1C+2G+3H | 1A+2G+3B+4G | 1B+2F+3C+4O |
| 1A+2C | 1C+2G+3I | 1A+2G+3B+4H | 1B+2F+3C+4P |
| 1A+2G | 1C+2H+3G | | |
| 1A+2I | 1C+2H+3H | 1A+2I+3A+4W | 1B+2F+3D+4N |
| | 1C+2H+3I | 1A+2I+3A+4X | 1B+2F+3D+4O |
| 1A+2A+3A | | 1A+2I+3A+4Y | 1B+2F+3D+4P |
| 1A+2A+3B | 1C+2I+3G | | |
| | 1C+2I+3H | 1A+2I+3B+4W | 1B+2F+3E+4N |
| 1A+2B+3A | 1C+2I+3I | 1A+2I+3B+4X | 1B+2F+3E+4O |
| 1A+2B+3B | | 1A+2I+3B+4Y | 1B+2F+3E+4P |
| | 1C+2G | | |
| 1A+2C+3A | 1C+2H | 1B+2D+3C+4I | 1C+2G+3G+4Q |
| 1A+2C+3B | 1C+2I | 1B+2D+3C+4J | 1C+2G+3G+4R |
| | | | 1C+2G+3G+4F |
| 1A+2G+3A | 1A+2A+3A+4A | 1B+2D+3D+4I | |
| 1A+2G+3B | 1A+2A+3A+4B | 1B+2D+3D+4J | 1C+2G+3H+4S |
| | 1A+2A+3A+4C | | |
| 1A+ 68 3A | | 1B+2D+3E+4I | 1C+2G+3I+4R |
| 1A+2I+3B | 1A+2A+3B+4A | 1B+2D+3E+4J | 1C+2G+3I+4S |
| | 1A+2A+3B+4B | | 1C+2G+3I+4G |
| 1B+3D+3C | 1A+2A+3B+4C | 1B+2D+3F+4I | |
| 1B+2D+3D | | 1B+2D+3F+4J | 1C+2H+3G+4T |
| 1B+2D+3E | 1A+2B+2A+4D | | 1C+2H+3G+4U |
| 1B+2D+3F | 1A+2B+3A+4E | 1B+2E+3C+4K | 1C+2H+3G+4V |
| | | 1B+2E+3C+4L | |
| 1B+2E+3C | 1A+2B+3B+4D | 1B+2E+3C+4M | 1C+2H+3H+4T |
| 1B+2E+3D | 1A+2B+3B+4E | | 1C+2H+3H+4V |
| 1B+2E+3E | | 1B+2E+3D+4K | |
| 1B+2E+3F | 1A+2C+3A+4F | 1B+2E+3D+4L | 1C+2H+3I+4T |
| | 1A+2C+3A+4G | 1B+2E+3D+4M | 1C+2H+3I+4U |
| 1B+2D | 1A+2C+3A+4H | | 1C+2H+3I+4V |
| 1B+2E | | 1B+2E+3E+ 4K | |
| 1B+2F | 1A+2C+3B+4F | 1B+2E+3E+4L | 1C+2I+3G+4W |
| | 1A+2C+3B+4G | 1B+2E+3E+4M | 1C+2I+3G+4X |
| 1B+2F+3C | 1A+2C+3B+4H | | 1C+2I+3G+4Y |
| 1B+2F+3D | | 1B+2E+3F+4K | |
| 1B+2F+3E | 1A+2G+3A+4F | 1B+2E+3F+4L | 1C+2I+3H+4W |

For example, lyric phrase 1A "I am very happy" may be combined with the lyric 2A "when you are near to me," as listed in Table I. Alternatively, lyric phrases 1A, 2B and 3A may be combined to provide the lyric "I am very happy, so happy I could cry, you make me so happy." As shown in Table II, an extremely wide selection of different lyrics is provided by the use of the present invention. Of course, it will be understood that different cassettes for use with the invention would contain different types of lyric phrases, including contemporary, country and western, ballads and the like.

Figure 2:
FIGS. 2–5 illustrate typical sets of two bar melodies which are sequentially stored on the melody cassette shown in FIG. 1.
Figure 4:
Figure 3:
Figure 5:

FIGS. 2–8 assist in understanding the combination of the melody phrases prerecorded on cassette 28 shown in FIG. 1. FIG. 2 illustrates three two-bar melody phrases entitled 1A, 1B and 1I. The remaining 20 melody phrases in Group 1 are omitted for clarity of illustration. FIG. 3 illustrates three two-bar melody phrases from Group 2, i.e., 2G, 2J and 2N. FIG. 4 illustrates three melody phrases from Group 3, i.e. 3A, 3B and 3C. FIG. 5 illustrates three melody phrases out of 23 melody phrases from Group 4, i.e. 4A, 4B and 4C. As may be seen, each of the two-bar melody phrases shown in FIGS. 2–5 is different. The melody phrases shown in FIG. 2 are compatible for mixing with the lyric phrases in Group 1 shown in Table I, and are also compatible for preceding the melody phrases of FIG. 3. Likewise, the melody phrases shown in FIG. 3 are compatible with the lyric phrases of Group 2 as shown in FIG. 2, and so on for FIGS. 4 and 5.

Figure 6:
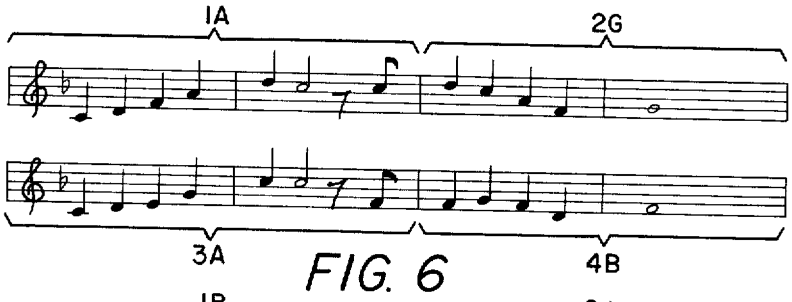
FIGS. 6–8 disclose three different possible combinations of various ones of the two bar melodies shown in FIGS. 2–5 in order to provide a unitary eight bar melody.
Figure 7:
Figure 8:

As previously noted, in the operation of the system, a large number of combinations of melody phrases shown in FIGS. 2–5 is possible. FIGS. 6–8 illustrate three possible combinations which provide unitary full eight measure phrases. For example, FIG. 6 illustrates the combination of melody phrases 1A + 2G + 3A + 4B, previously shown in FIGS. 2–5. Similarly, FIG. 7 illustrates the combination of melody phrases 1B + 2J + 3B + 4A. FIG. 8 illustrates the combination of melody phrases 1I + 2N + 3C + 4C. Other combinations of melody phrases will, of course, be possible.

Figure 9:
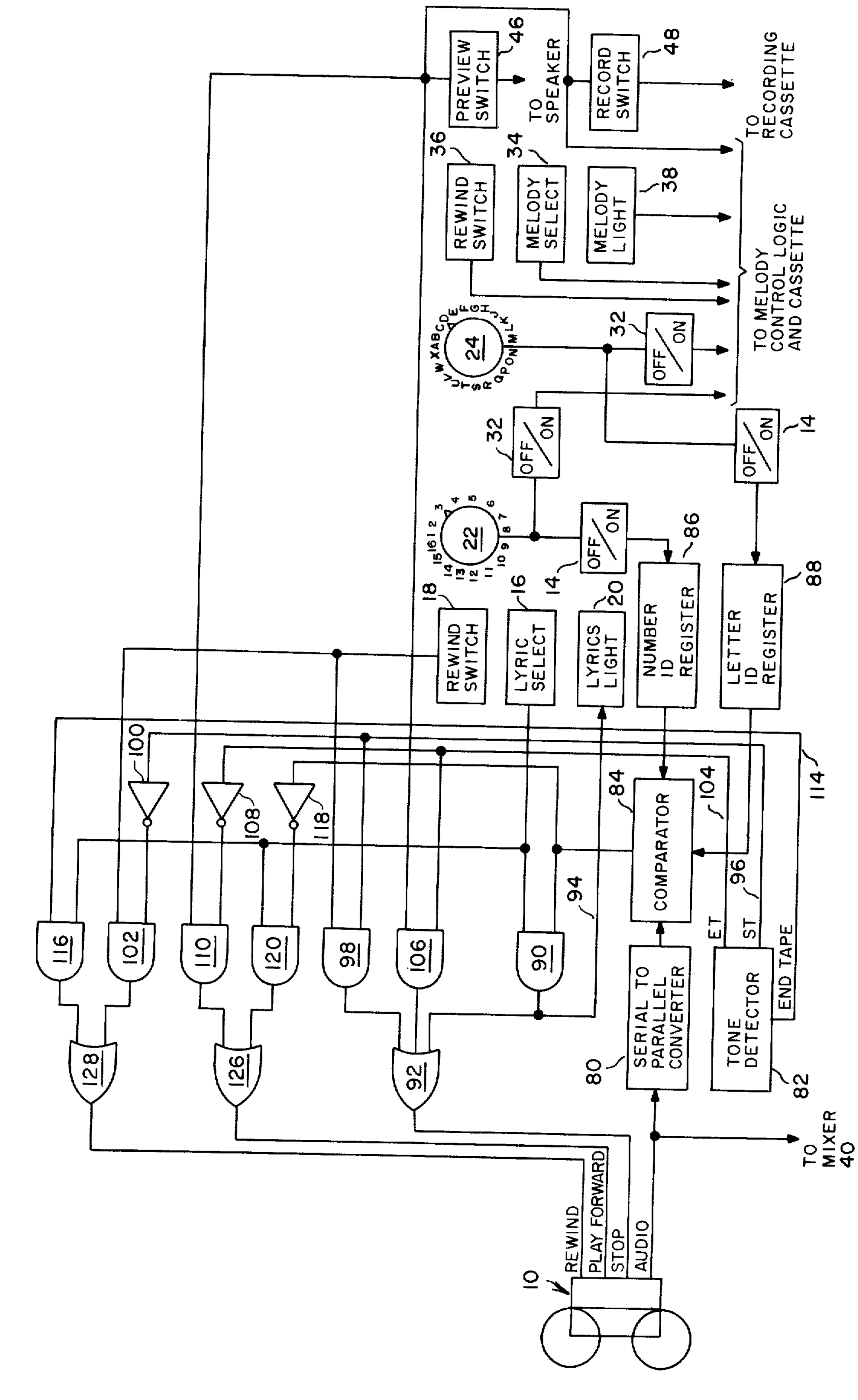
FIG. 9 is a schematic diagram of the lyric control logic shown in FIG. 1.

FIG. 9 illustrates a schematic diagram of the logic control circuitry for the lyric selection portion of the circuit. The logic control circuitry for the melody selection portion of the system is identical to the lyric logic control, and therefore is omitted for clarity of illustration. Like numerals will be utilized for like and corresponding parts in the various drawings.

The lyric cassette device 10 includes three input lines including rewind, play forward and stop and also includes an audio output line. The audio output is applied to a serial-to-parallel convertor 80 and to a tone detector 82. In addition, the audio output from the cassette 10 is applied to the mixer 40 in the manner shown in FIG. 1. The output of the serial-to-parallel convertor 80 is applied to a comparator 84 for comparing with the outputs provided by the rotary switches 22 and 24 previously described in FIG. 1. Rotary switch 22 is connected through the off/on switch 14 to a number ID register 86. Thus, if the off/on switch 14 is depressed to the on position, the position of the switch 22 causes a digital indication of the switch to be loaded into the register 86. Sixteen different digital indications will thus be generated by the switch 22 to correspond with the 16 switch positions.

The output of the rotary switch 24 is connected through the off/on switch 14 (FIG. 1) to the letter ID register 88, wherein any one of 23 digital representations of the position switch 24 may be stored. Switch 14 is a two stage switch to control both the outputs of the rotary switches 22 and 24, and is diagrammatically illustrated in FIG. 9. The output of register 86 and register 88 are applied to the comparator 84, which compares the parallel digital outputs of the registers with the parallel output of the converter 80.

The output of the comparator 84 is applied to an input of an AND gate 90, the output of which is applied to an OR gate 92. The output of the OR gate 92 operates to control the stop function of the cassette 10. The output of the AND gate 90 is also applied via lead 94 to control the energization of the lyric light lamp 20. The second input of the gate 90 is applied from the lyric select pushbutton switch 16 (FIG. 1).

The tone detector 82 contains three filter stages for detecting three possible different tones impressed between the lyric phrases on the magnetic tape in cassette 10. The start tone (ST) when detected by the detector 82 creates a logic level on lead 96 which is applied to an input of an AND gate 98 and is applied through an invertor 100 to an input of an AND gate 102. The end tone (ET) applies a logic level via lead 104 to an input of an AND gate 106 and through an invertor 108 to an input of an AND gate 110. The end of tape signal (END TAPE) creates a logic level from the detector 82 on lead 114 which is applied to an input of an AND gate 116.

The output of the comparator 84 is also applied through an invertor 118 to an input of an AND gate 120. The output from the lyric select button 16 is also applied to an input of gate 120 and to an input of gate 116. The output of the preview switch 46 (FIG. 1) is applied to an input of gate 106 and to an input of gate 110. A state of operation of the record switch 48 is also applied to the input of gates 106 and 110.

The outputs of gates 90, 106 and 98 are applied as the inputs to the OR gate 92. The outputs of gates 110 and 120 are applied through an OR gate 126 which provides the play forward control signal to the cassette 10. The outputs of gates 102 and 116 are applied through an OR gate 128 which generates the rewind control signal applied to the cassette 110.

As previously noted, coded tone signals are prerecorded on the magnetic tapes used in cassette units 10 and 28 in order to allow identification of the location of each of the phrases recorded on the tape. Specifically, in front of each lyric phrase and melody phrase on the magnetic tape, a prerecorded identification digital tone signal is impressed, followed by the start tone (ST). Immediately after each lyric and melody phrase, the end tone (ET) is impressed. Moreover, at the very end of each of the magnetic tapes, an END TAPE tone is impressed. The three ST, ET and END TAPE tones are of different frequencies, and are preferably above the audio range so that they are not duplicated by tones found in any of the prerecorded lyric or melody phrases. The identification coded digital signals are different for each phrase, and correspond to ones of the output codes from the rotary switches 22 and 24. For example, the identification tone signals may comprise frequency shift key (FSK) tone signals.

In operation of the system, in order to preview a selected lyric phrase, the off/on button switch 14 is depressed to energize the lyric control logic circuitry. The rotary switches 22 and 24 are then positioned as previously indicated to the desired position. For example, assume that the rotary switch 22 is positioned at the position 1, while the rotary switch 24 is positioned at number D. A digital code representative of the position 1 is loaded into register 86, while a digital code representative of number D is loaded into register 88.

The lyric select button 16 is then depressed, and as the comparator 84 at this time does not detect a matching digital code from the output of convertor 80, gate 120 operates through OR gate 126 in order to generate a play forward signal to the cassette 10. The cassette 10 begins to play back the prerecorded lyric phrases. The resulting audio signals are applied sequentially to the serial-to-parallel convertor 80 which is tuned to detect only the prerecorded ID tones located prior to each lyric phrase. When the convertor 80 applies the same identification code to the comparator 84 as is provided by registers 86 and 88, the comparator 84 generates a logic level indication to gate 90 which operates through OR gate 92 in order to generate a stop signal. The cassette 10 then stops just in front of the desired lyric phrase as chosen by the setting of switches 22 and 24.

If it is now desired to preview or to record the selected lyric phrase, either the preview switch 46 or record switch 48 is depressed, thereby generating an indication to gate 110. The tone detector 82 does not detect the presence of the ET signal at this time and this logic level is applied through invertor 108 to provide an $\overline{ET}$ signal to provide through AND gate 110 and OR gate 126 a play forward signal to the cassette 10. The cassette 10 then plays forward over the duration of the selected lyric phrase and the audio lyric phrase is provided to the mixer 40 in the manner previously illustrated so that the user can hear the selected phrase via the speaker 50 or the selected lyric phrase may be recorded on the cassette 54.

After the lyric phrase is played by cassette 10, the tone detector 82 detects the occurrence of the ET signal and applies a logic level to gate 106 which also receives an energization level signal from either the preview switch 46 or the record switch 48. Consequently, gate 106 applies through the OR gate 92 a stop signal to the cassette 10 and the cassette stops the playback at that point.

At this time, the user may operate the lyric select switch 16 to select a different lyric phrase, if desired. Alternatively, if the user desires to either record the selected lyric phrase or to save the lyric phrase for mixing with a selected melody, the user may depress the rewind switch 18 which generates a logic level to gate 102. This logic level is combined at the input of gate 102 with an indication from the detector 82 that the ST tone is not present, which is applied through the invertor 100 to provide an ST signal to gate 102. Consequently, a signal is generated via gates 102 and 128 to rewind the cassette 10. This rewinding continues until the tone detector 82 detects the occurrence of the $\overline{ST}$ signal indicating the start of the selected lyric phrase. An indication is thus provided by the detector 82 via lead 96 to gate 98 which is coupled with a logic input from the rewind switch 18. Consequently, a stop signal is applied from the output of the OR gate 92 in order to stop the rewinding operation in front of the selected lyric phrase. The lyric phrase may then be replayed whenever it is desired.

During operation of the lyric select switch 16 to search for the desired lyric phrase corresponding to the positions of switches 22 and 24, the cassette 10 in some cases may play to the end of the tape without finding the selected lyric phrase. If this occurs, the tone detector 82 detects the third END TAPE tone signal and generates an indication via lead 114 to gate 116. This logic indication to 116 is combined with an indication of the depression of lyric select switch 16, and thus a rewind signal is generated from gate 128 and the cassette is completely rewound automatically. Search for the selected lyric phrase is then continued.

After the selected lyric phrase has been positioned for mixing and recording as previously described, the off/on switch 14 may be depressed to deenergize the lyric select system and a melody phrase selected. As previously described, the selection of the melody select corresponds with the selection of the lyric phrase, with the exception that the off/on button 32 is depressed to energize the melody selection circuitry and the melody select button 34 and the rewind switch 36 are operated. The circuitry for control of the cassette 28 is identical to the logic control circuitry shown in FIG. 9 with respect to the lyric select, and it is thus not described in detail.

After the melody phrase has been selected, the off/on switch 14 is depressed to energize both the cassettes 10 and 28. The record switch 48 may then be depressed so that the selected lyric and melody phrases are simultaneously played back to the mixer 40, whereupon the phrases are mixed and recorded on the cassette 54 as previously described.

The present system thus enables an amateur musician to originate and record a music composition with both melody and lyrics which are aesthetically acceptable and technically correct in form. The product is relatively inexpensive, self contained and operable completely under the control of the user. A prerecorded cassette is utilized to provide lyric and melody phrases, and may be utilized to provide a complete 32 bar music piece in any given style such as folk songs, contemporary, country and western, rhythm and blues or the like. If desired, a microphone is provided to enable the integration of the user's personally originated melody and/or lyrics if he so desires.

Although the present invention has been illustrated with a particular logic circuitry and circuit control based upon prerecorded tones on the magnetic tape, it will be understood that other types of control circuitry could be utilized with the invention, such as counter circuitry for counting the time interval between prerecorded phrases. In addition, automatic features may be added to the present invention in order that the system will automatically rewind to the start of the selected phrase after preview, rather than requiring manual operation of a rewind button.

After recording of the original composition on the cassette 54, the tape cassette may be removed and sent to a central service which may then provide a hard copy of the selected musical composition. Alternatively, the user could send a list of the selected lyric and melody phrases to the central location, which would then provide the appropriate phrases and melody and the sheet form to the user. Alternatively, blank music composition paper could be provided with the device, along with a supply of punch-outs of the various lyric and melody phrases which could be compiled after completion of the song.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An electronic system for composing a variety of different songs comprising:

first and second sound playback units;

a lyric storage medium having a plurality of lyric groups recorded thereon in a first sequential order for audible reproduction by said first playback unit, each of said lyric groups having a plurality of discrete lyric phrases recorded therein with all of the said lyric phrases within any one of said lyric groups having the same meter, the same recording time length, and being configured to interfit in structure and meaning with any one of the lyric phrases in an adjacent lyric group when associated in said first sequential order;

first location addresses recorded on said lyric medium identifying the lyric groups and the lyric phrases within said lyric groups;

a melody storage medium having a plurality of melody groups recorded thereon in a second sequential order for audible reproduction by said second playback unit, each of said melody groups having a plurality of discrete melody phrases recorded therein with all of the said melody phrases within any one of said melody groups having the same meter, the same recording time length, and being configured to musically interfit with any one of the melody phrases in an adjacent melody group when associated in said second sequential order;

second location addresses recorded on said melody medium identifying the melody groups and the melody phrases within said melody groups;

the lyric phrases in any lyric group having the same meter and recording time length as the melody phrases in the correspondingly addressed melody group;

electronic control means operatively connected to said first and second playback units comprising:

selection switches for selecting a location address corresponding to said first and second location addresses;

control logic means responsive to said selection switches for automatically positioning the correspondingly addressed lyric or melody phrase in said first or second playback unit, respectively, for playback;

playback control measn actuating said first or second playback unit for audibly reproducing the selected lyric or melody phrase, said playback control means further including means selectively actuating both said first and second playback units simultaneously for audibly reproducing in synchronism said selected lyric and melody phrases;

mixer means for combining said synchronously reproduced lyric and melody phrases; and a third playback unit responsive to said mixer means for recording said combined lyric and melody phrases.

2. The electronic system of claim 1 wherein said lyric storage medium and melody storage medium comprise magnetic tape cassettes which may be selectively inserted into said playback units.

3. The electronic system for composing songs defined in claim 1 and further comprising:

means for selectively previewing a selected lyric or melody phrase prior to recording thereof.

4. The electronic system of claim 1 wherein each of said melody phrases has a length of two bars.

5. The electronic system of claim 1 wherein said lyric and melody storage mediums have an end signal recorded at the end of each lyric and melody phrase; and said control means including means responsive to said end signals for stopping said first and second playback units at the end of the reproduction of said lyric and melody phrase, thereby permitting the next sequential lyric and melody phrases to be selected by said selection switches.

* * * * *